US00RE39314E

(19) United States
(12) Reissued Patent
Nemoto

(10) Patent Number: US RE39,314 E
(45) Date of Reissued Patent: Oct. 3, 2006

(54) HOUSING ASSEMBLY FOR AN AIR BAG AND VEHICLE HORN SWITCH

(75) Inventor: Hiroshi Nemoto, Mesa, AZ (US)

(73) Assignee: TRW Inc., Lyndhurst, OH (US)

(21) Appl. No.: 09/196,029

(22) Filed: Nov. 19, 1998

Related U.S. Patent Documents

Reissue of:
(64) Patent No.: 5,577,767
Issued: Nov. 26, 1996
Appl. No.: 08/400,260
Filed: Mar. 8, 1995

(51) Int. Cl.
*B60R 21/16* (2006.01)

(52) U.S. Cl. ..... 280/731; 200/61.54
(58) Field of Classification Search ..... 280/731, 280/728.3; 200/61.54–61.57
See application file for complete search history.

(56) References Cited

U.S. PATENT DOCUMENTS

| | | | | | |
|---|---|---|---|---|---|
| 4,612,425 | A | | 9/1986 | Kanai et al. | |
| 4,903,986 | A | * | 2/1990 | Cok et al. | 280/731 |
| 4,934,735 | A | * | 6/1990 | Embach | 280/731 |
| 5,002,306 | A | * | 3/1991 | Hiramitsu et al. | 280/731 |
| 5,085,461 | A | * | 2/1992 | Shibata | 280/731 |
| 5,085,462 | A | * | 2/1992 | Gualtier | 280/731 |
| 5,186,490 | A | | 2/1993 | Adams et al. | |
| 5,198,629 | A | * | 3/1993 | Hayashi et al. | 280/731 |
| 5,265,904 | A | | 11/1993 | Shelton et al. | |
| 5,265,905 | A | * | 11/1993 | Shelton | 280/731 |
| 5,308,106 | A | | 5/1994 | Heidorn | |
| 5,369,232 | A | | 11/1994 | Leonelli | 280/731 |
| 5,465,998 | A | * | 11/1995 | Davis | 280/731 |
| 5,576,684 | A | * | 11/1996 | Langford | 338/50 |
| 5,585,606 | A | | 12/1996 | Ricks | |
| 5,684,283 | A | * | 11/1997 | Hambleton et al. | 280/735 |
| 5,721,409 | A | * | 2/1998 | Enders | 280/731 |
| 5,723,834 | A | * | 3/1998 | Hambleton et al. | 280/731 |

FOREIGN PATENT DOCUMENTS

| | | | | |
|---|---|---|---|---|
| JP | 4-5171 | | 1/1992 | |
| JP | 5-16756 | * | 1/1993 | 280/731 |
| JP | 05016756 | A | 1/1993 | |
| JP | 40516756 | | 1/1993 | |
| JP | 5-10124 | * | 2/1993 | |
| JP | 06092196 | A | 4/1994 | |
| JP | 7-5980 | | 1/1995 | |
| JP | 7-11480 | | 2/1995 | |
| JP | 7-40838 | | 2/1995 | |

* cited by examiner

*Primary Examiner*—Paul N. Dickson
(74) *Attorney, Agent, or Firm*—Tarolli, Sundheim, Covell & Tummino L.L.P.

(57) ABSTRACT

An apparatus for enclosing an air bag (38) on a steering wheel (22) includes an inner cover (34) at least partially enclosing the air bag (38) and having a tear seam central portion (50) along which the inner cover ruptures upon inflation of the air bag (38). An outer cover (36) at least partially encloses the inner cover (34) and the air bag (38) and includes a tear seam central portion (49) with a length substantially equal to the length of the tear seam central portion (50) in the inner cover (34). A horn switch (58) is disposed between the inner and outer covers (34 and 36) for effecting operation of a horn. The horn switch (58) includes first and second tear seams (64, 65) aligned with the tear seam central portions (50 and 49) in the inner and outer covers (34 and 36). The first and second tear seams (64, 65) in the horn switch (58) have a combined length substantially less than the length of each of the tear seams (49 and 50).

13 Claims, 4 Drawing Sheets

HOUSING ASSEMBLY FOR AN AIR BAG AND VEHICLE HORN SWITCH

Matter enclosed in heavy brackets [ ] appears in the original patent but forms no part of this reissue specification; matter printed in italics indicates the additions made by reissue.

BACKGROUND OF THE INVENTION

The present invention relates to an apparatus for enclosing an air bag on a steering wheel of a vehicle having a horn.

A known apparatus for enclosing an air bag on a steering wheel of a vehicle having a horn is disclosed in U.S. Pat. No. 5,002,306. U.S. Pat. No. 5,002,306 also discloses two horn switches enclosed by the apparatus. The horn switches are located on opposite sides of a tear seam in an air bag cover. Each horn switch has connectors for connecting the horn switch to a source of electrical energy in the vehicle.

SUMMARY OF THE INVENTION

The present invention provides a new and improved apparatus for enclosing an air bag on a steering wheel of a vehicle having a horn. The apparatus of the present invention includes an inner cover which at least partially encloses the air bag. The inner cover has a tear seam. An outer cover at least partially encloses the inner cover and the air bag. The outer cover also has a tear seam which overlies the tear seam on the inner cover. A vehicle horn switch is disposed between the inner and outer covers.

The horn switch includes first and second spaced apart tear seams. The first and second tear seams in the horn switch are aligned with the tear seams in the inner and outer covers and have a combined length substantially less than the length of each of the tear seams in the inner and outer covers. When the air bag inflates, the tear seams in the inner cover, in the outer cover and in the horn switch are ruptured by the inflating air bag.

The horn switch includes first and second layers of electrically conductive material. Each layer of electrically conductive material includes two layer portions located on opposite sides of the tear seams in the inner and outer covers. The two layer portions are interconnected by an interconnecting portion which extends across the tear seams in the inner and outer covers. An envelope of electrically insulating material extends around the first and second electrically conductive layers of the horn switch. The envelope also has portions extending around the interconnecting portions. The envelope and interconnecting portions comprise spaced portions of the horn switch and have tear lines along which the envelope and interconnecting portions rupture which define the first and second tear seams in the horn switch.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

BRIEF DESCRIPTION OF THE DRAWINGS EMBODIMENTS OF THE PRESENT INVENTION

Figure 1:
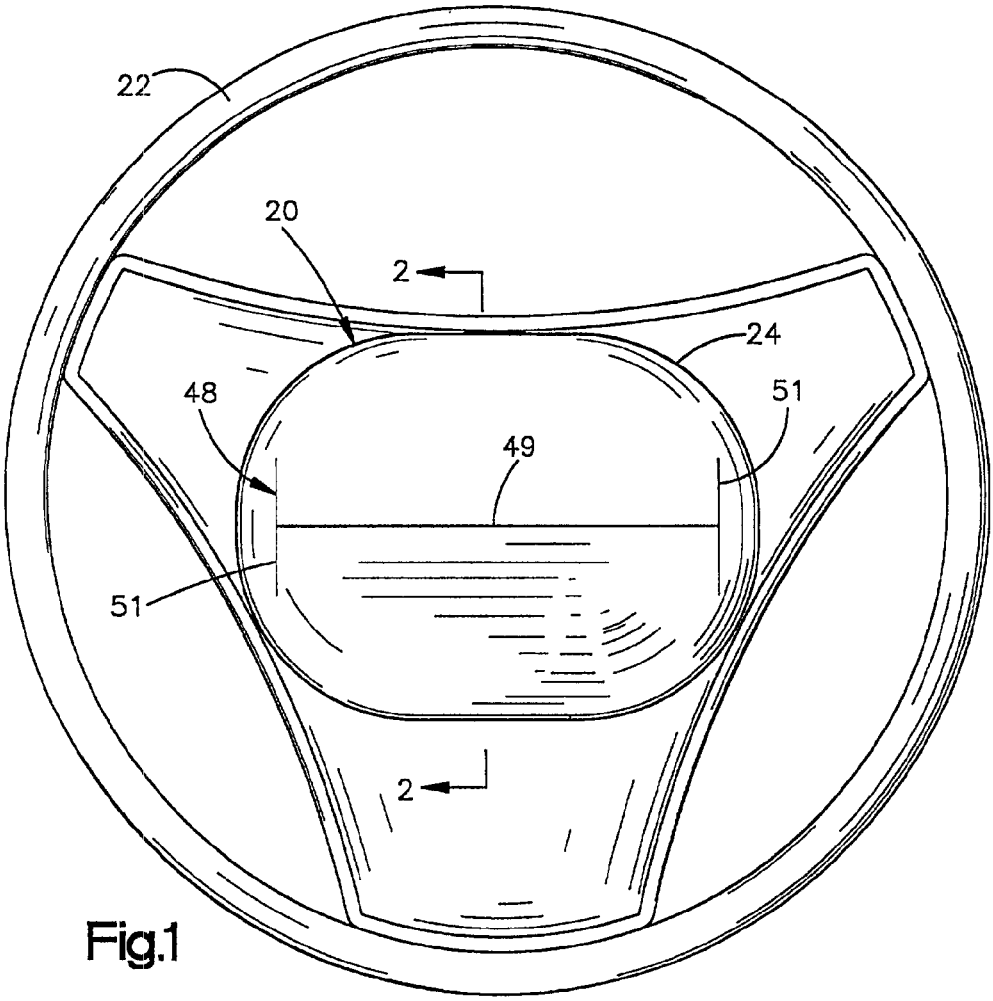
FIG. 1 is a schematic plan view illustrating an apparatus for enclosing an air bag on a vehicle steering wheel.

In accordance with the present invention, an air bag module 20 (FIGS. 1 and 2) is mounted on a steering wheel 22 of a vehicle. The air bag module 20 includes a housing assembly 24. The housing assembly 24 includes a generally rectangular metal base 28 (FIG. 2) which is connected with the steering wheel by suitable connectors (not shown).

The housing assembly 24 also includes a relatively stiff inner cover 34 connected to the base 28. The inner cover 34 encloses an air bag 38, partially shown in FIG. 2. A resiliently deflectable outer cover 36 encloses the inner cover 34 and the air bag 38. The inner cover 34 has an outer wall 40 and side walls 42 extending from the outer wall 40. The side walls 42 are connected to the base 28. The outer cover 36 has an outer wall 44 covering the outer wall 40 of the inner cover 34 and side walls 46 extending from the outer wall 44. The side walls 46 are connected to the base 28.

The outer cover 36 has weakened areas providing a tear seam 48 preferably having an H-shape (FIG. 1). A central portion 49 of the tear seam 48 extends across the outer wall 44 of the outer cover 36 between legs 51 of the H-shaped tear seam 48. The inner cover 34 also has weakened areas providing a tear seam which is also H-shaped. The tear seam in the inner cover 34 (FIG. 2) lies directly under the tear seam 48 and has a central portion 50 that lies directly under the portion 49 of the tear seam 48. The tear seam central portion 50 has substantially the same length as the tear seam central portion 49.

The air bag 38 (FIG. 2) is connected with the base 28 in any suitable manner. As illustrated, the air bag 38 is connected with base 28 by an annular metal clamp ring 52 and suitable fasteners (not shown). The clamp ring 52 clamps an open end or mouth of the air bag 38 to the base 28. The air bag 38 is clamped around a generally cylindrical air bag inflator 54. The inflator 54 is also secured to the base 28 in a suitable manner. The inflator 54 provides a source of fluid for inflating the air bag 38. The inflator may have many different constructions as is known.

Upon the occurrence of sudden vehicle deceleration requiring air bag inflation, a suitable control apparatus (not shown) activates the inflator 54. The inflator 54, when activated, emits a flow of fluid which inflates the air bag 38. As the air bag 38 inflates, the air bag applies pressure to the inside of the inner cover 34. In response to the pressure, the inner cover 34 ruptures along the tear seam 50, and the outer cover 36 ruptures along the tear seam 48. The pressure applied by the air bag 38 against the inside of the inner cover 34 pivots portions of the inner cover and the outer cover 36 out of the path of inflation of the air bag 38. The air bag 38, when inflated, restrains the vehicle driver from forcefully striking structural parts of the vehicle, such as the steering wheel 22.

Figure 2:
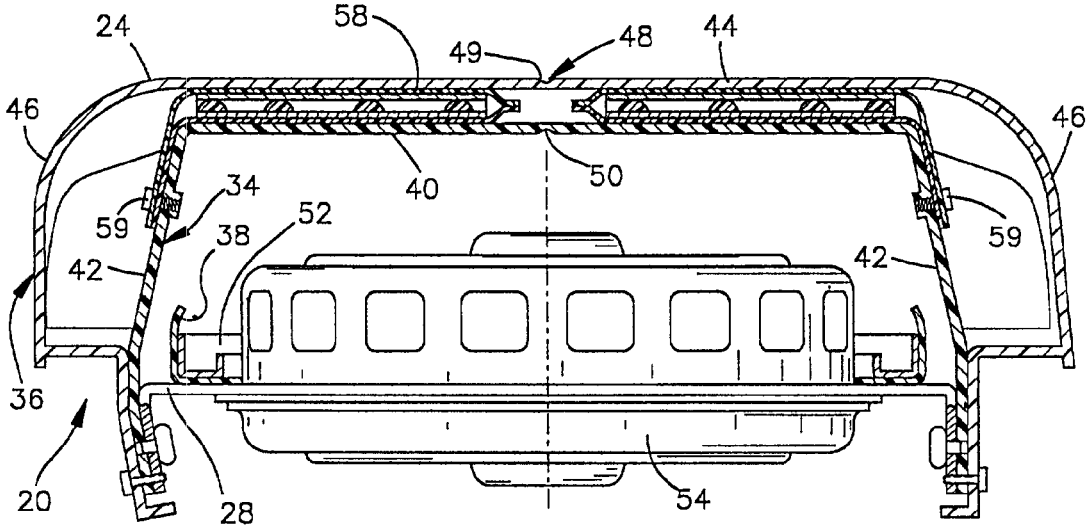
FIG. 2 is an enlarged, schematic, sectional view, taken generally along the line 2—2 of FIG. 1.

A horn switch 58 (FIGS. 2 and 3) is disposed between the inner and outer covers 34 and 36. The horn switch 58 is connected to the inner cover by threaded fasteners 59 (FIG. 2). The horn switch 58 is connected with ground and a source of electrical energy, such as a vehicle battery, through conductors 60 and 62 and a connector 63 (FIG. 3).

The horn switch 58 has an area that is approximately the same as the area of the outer walls 40 and 44 of the inner and outer covers 34 and 36. When the vehicle horn is to be operated, pressure is manually applied against the outer cover 36 to actuate the horn switch 58 and effect operation of the vehicle horn.

Figure 3:
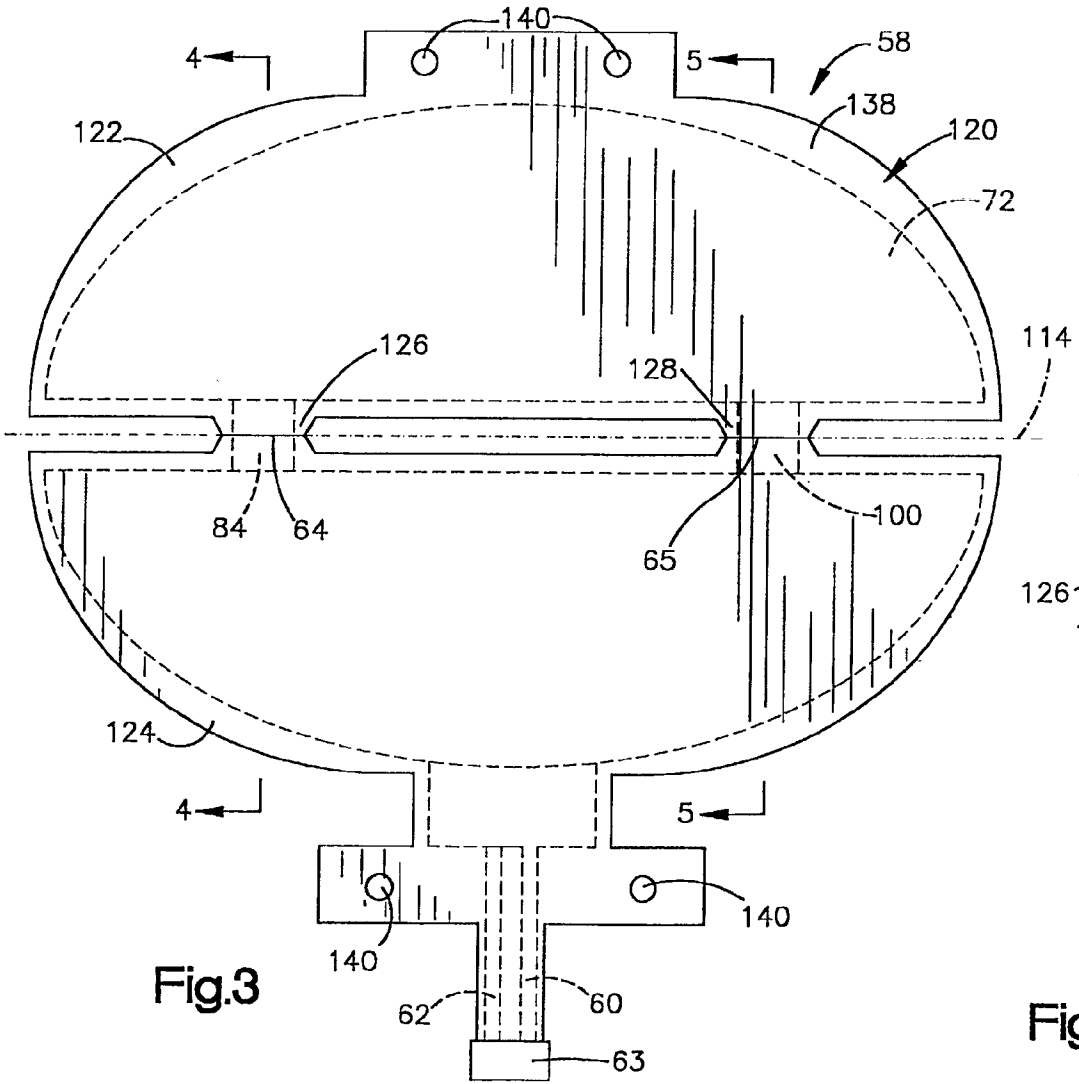
FIG. 3 is a schematic plan view illustrating a first embodiment of a horn switch of the present invention.

The switch 58 has first and second spaced tear seams 64 and 65 (FIG. 3). The switch 58 ruptures along the tear seams 64, 65 upon inflation of the air bag 38. The tear seams 64, 65 may be defined by weakened or perforated areas. The tear seams 64, 65 overlie the central portion 50 of the tear seam in the inner cover 34. Because the central portion 50 is aligned with the central portion 49 of the tear seam 48 in the outer cover 36, the central portion 49 overlies the tear seams 64, 65.

The combined lengths of the first and second tear seams 64 and 65 is substantially less than the lengths of each of the tear seam central portions 49 and 50. The combined lengths of the first and second tear seams 64 and 65 is about one-sixth (1/6) the length of each of the tear seam central portions 49 and 50. Since only a small portion of the horn switch 58 ruptures as compared to the inner and outer covers 34 and 36, the horn switch has a minimum retarding effect on inflation of the air bag.

Figure 5:
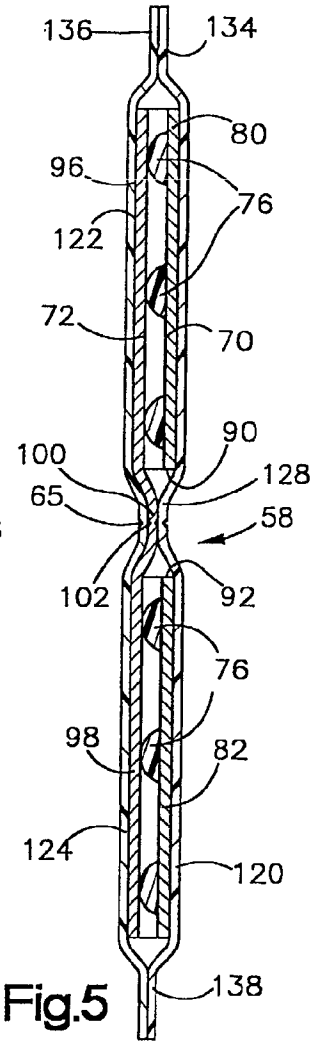
FIG. 5 is an enlarged sectional view, taken generally along the line 5—5 of FIG. 3.
Figure 4:
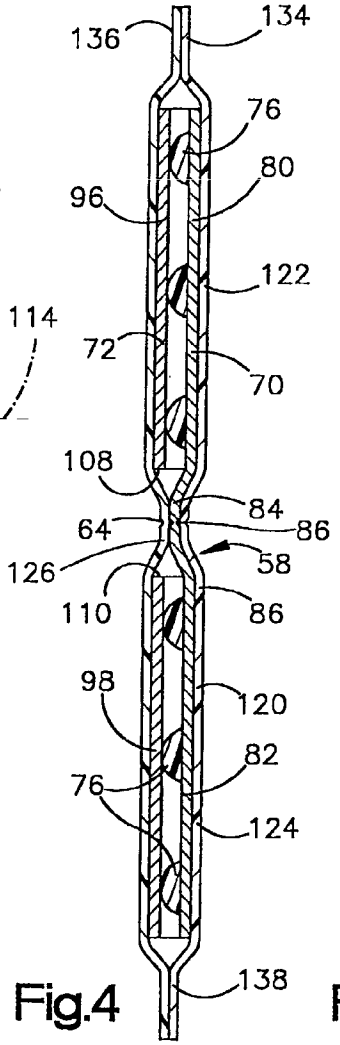
FIG. 4 is an enlarged sectional view, taken generally along the line 4—4 of FIG. 3.

The switch 58 includes a pair of generally flat, flexible, overlying layers 70 and 72 (FIGS. 4–7) of electrically conductive material. Dots or bumps 76 (FIGS. 4 and 5) of polymeric material, which is electrically insulating, are disposed between the layers 70 and 72. The bumps 76 are secured to the layer 70 and engage the layer 72 to separate the two layers until pressure is applied to deflect the layers 70, 72 into engagement with one another. Engagement of the layers 70 and 72 completes an electrical connection to effect operation of the vehicle horn. The layers 70, 72 engage when sufficient pressure is manually applied against the outer cover 36.

The layer 70 (FIGS. 4 and 6) includes layer portions 80 and 82 spaced apart from each other on opposite sides of the tear seam 64 of the horn switch 58. An interconnecting portion 84 of the layer 70 interconnects the portions 80 and 82 and extends across the central portions 50 and 49 of the tear seams in the inner and outer covers 34 and 36. The interconnecting portion 84 includes a tear line 86 (FIG. 6) along which the interconnecting portion ruptures upon air bag inflation. The tear line 86 is aligned with the tear seam central portions 50 and 49 in the inner and outer covers 34 and 36. The tear line 86 of the interconnecting portion 84 may or may not be weakened or perforated since the thickness of the interconnecting portion is small enough that it will easily tear upon inflation of the air bag. The layer portion 82 includes an extension 88 which is connected to the conductor 60.

Figure 6:
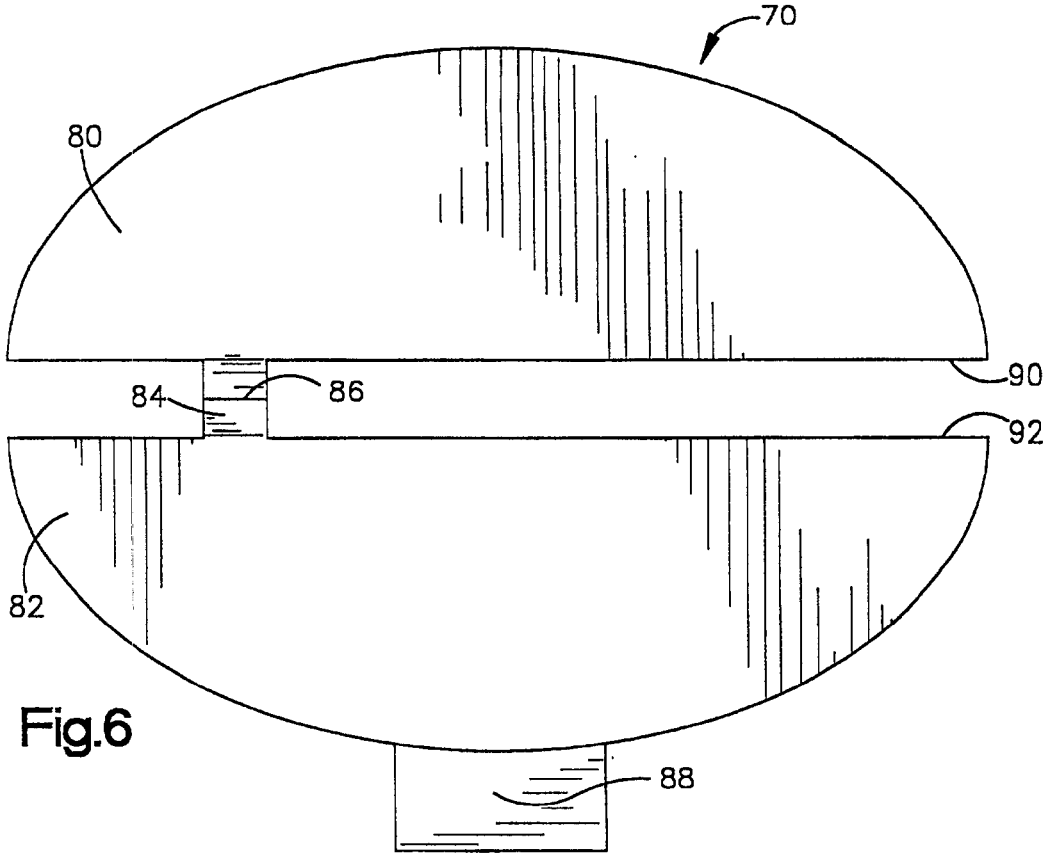
FIG. 6 is a schematic plan view of a layer of electrically conductive material of the horn switch of FIG. 3.
Figure 7:
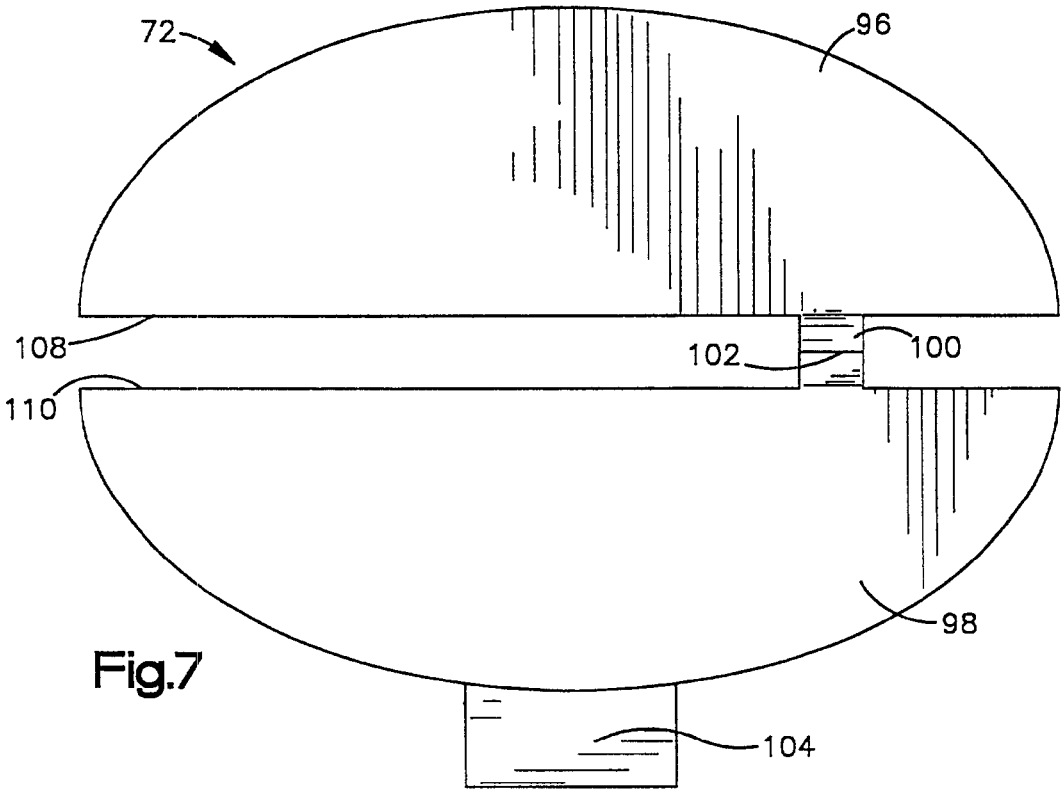
FIG. 7 is a schematic plan view of another layer of electrically conductive material of the horn switch of FIG. 3.

The portions 80 and 82 of the layer 70 include spaced apart, parallel edge portions 90 and 92, respectively (FIG. 6). Each of the edge portions 90 and 92 extends adjacent and parallel to the central portions 50 and 49 of the tear seams in the inner and outer covers 34 and 36. The interconnecting portion 84 has a dimension measured along the tear line 86 which is substantially less than the length of each of the tear seam portions 49 and 50 and also substantially less than the length of each of the edge portions 90 and 92, as can be clearly seen in FIG. 6. The length of the tear line 86 is less than about one-tenth (1/10) the length of each of the tear seam central portions 49 and 50.

The layer 72 (FIGS. 5 and 7) includes layer portions 96 and 98 spaced apart from each other on opposite sides of the tear seam 65 in the horn switch 58. An interconnecting portion 100 of the layer 72 interconnects the portions 96 and 98 and extends across the tear seam central portions 50 and 49 in the inner and outer covers 34 and 36. The interconnecting portion 100 includes a tear line 102 (FIG. 7) along which the interconnecting portion 100 ruptures upon air bag inflation. The tear line 102 is aligned with the tear seam central portions 49 and 50. The tear line 102 of the interconnecting portion 100 may or may not be weakened or perforated since the thickness of the interconnecting portion 100 is small enough that it will easily tear upon inflation of the air bag. The portion 98 includes an extension 104 which is connected to the conductor 62.

The portions 96 and 98 of the layer 72 have spaced apart, parallel edge portions 108 and 110, respectively, that extend adjacent and parallel to the tear seam central portions 50 and 49 in the inner and outer covers 34 and 36. The interconnecting portion 100 has a dimension measured along the tear line 102 which is substantially less than the length of each of the tear seam central portions 49 and 50 and substantially less than the length of each of the edge portions 108 and 110. The length of the tear line 102 is less than about one-tenth (1/10) of the length of each of the tear seam central portions 49 and 50. The interconnecting portion 100 (FIG. 3) is spaced apart from the interconnecting portion 84 of the layer 70 along a line 114 (FIG. 3) containing the tear lines 86 and 102.

The two layers 70 and 72 of electrically conductive material are enclosed by an envelope 120 (FIGS. 3–5) of electrically insulating material. The layers 70 and 72 and the envelope 120 are interconnected for installation in and removal from the housing assembly 24 as a unit. The envelope 120 includes a portion 122 enclosing the portions 80 and 96 of the layers 70 and 72. A portion 124 of the envelope 120 encloses portions 82 and 98 of the layers 70 and 72. The portions 122 and 124 are spaced apart from each other and located on opposite sides of the tear seams 64, 65 in the horn switch 58.

A portion 126 of the envelope 120 extends around the interconnecting portion 84 of the layer 70. A portion 128 of the envelope 120 extends around the interconnecting portion 100 of the layer 72 and is spaced apart from the portion 126. The portions 126 and 128 of the envelope 120 have tear lines along which the portions 126 and 128 rupture upon air bag inflation. The tear lines in the portions 126 and 128 are directly aligned with the tear lines 86 and 102 in the interconnecting portions 84 and 100 of the layers 70 and 72. The tear lines in the portions 126 and 128 may or may not be weakened or perforated since the thickness of the portions 126 and 128 is small enough that they will easily tear upon inflation of the air bag. The tear lines 86 and 102 in the interconnecting portions 84 and 100 and the tear lines in the portions 126 and 128 of the envelope 120 define the first and second tear seams 64 and 65 of the horn switch 58.

The envelope 120 is formed by a pair of generally flat layers 134 and 136 (FIGS. 4 and 5) of electrically insulating polymeric material. The layers 134 and 136 of electrically insulating material are disposed in a side-by-side relationship with the layers 70 and 72 of electrically conductive material. The layers 134 and 136 are bonded together along a flat rim portion 138 to form the envelope 120. The flat rim portion 138 extends around the periphery of the layers 70 and 72 of electrically conductive material. The flat rim portion 138 includes openings 140 for receiving the fasteners 59 to connect the horn switch 58 to the inner cover 34.

Figure 8:
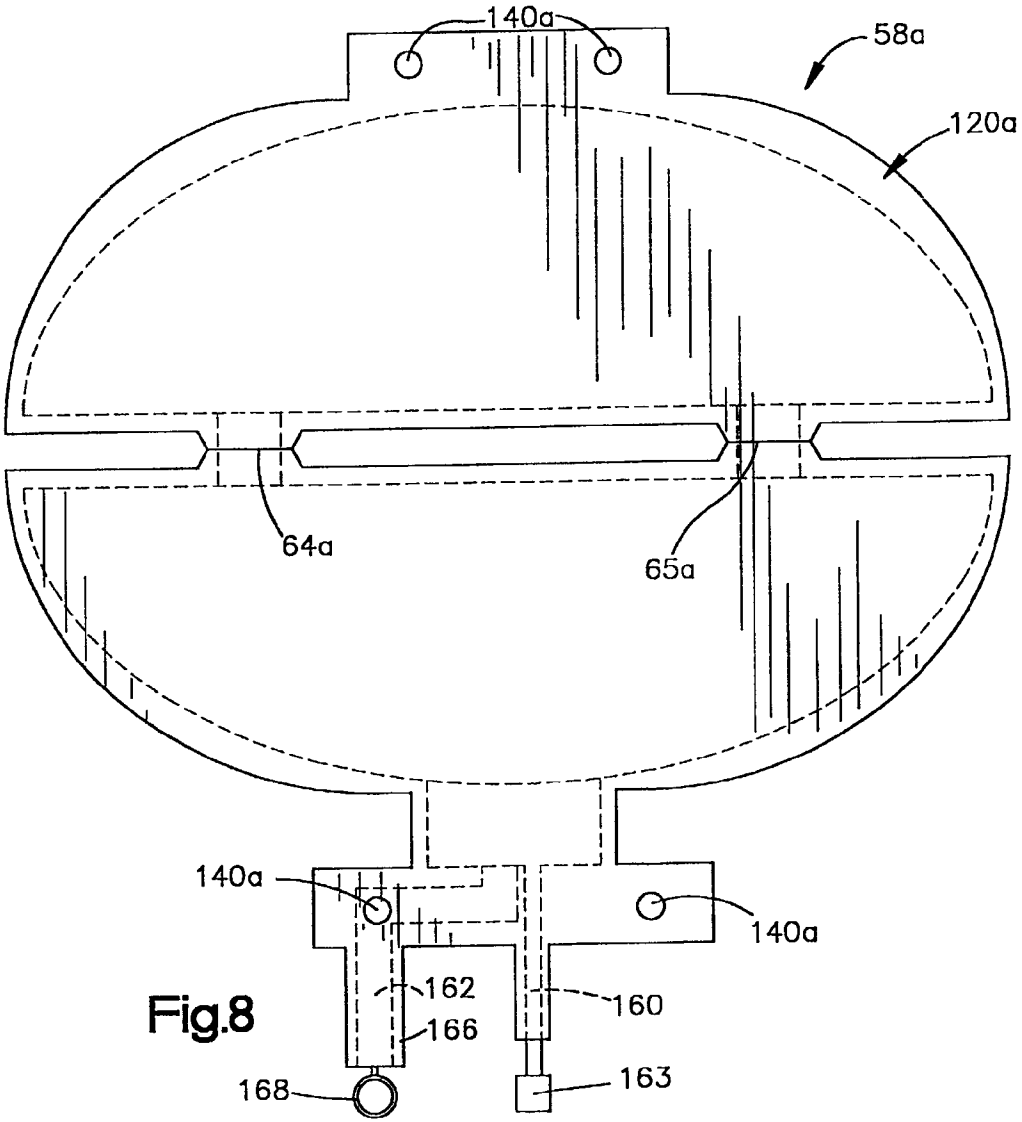
FIG. 8 is a schematic plan view illustrating a second embodiment of a horn switch of the present invention.

In the embodiment of the invention illustrated in FIGS. 1–7, the horn switch 58 is connected with a source of electrical energy and ground through conductors 60 and 62 and a connector 63. In the embodiment illustrated in FIG. 8, the horn switch is connected directly to ground. Since the embodiment of the invention illustrated in FIG. 8 is generally similar to the embodiment of the invention in FIGS. 1–7, similar numerals will be utilized to designate similar components, the suffix letter "a" being associated with the numerals of FIG. 8 to avoid confusion.

A horn switch 58a (FIG. 8) has first and second spaced tear seams 64a and 65a along which the horn switch ruptures upon inflation of an air bag. The tear seams 64a and 65a in the horn switch 58a are aligned with tear seam central portions 50 and 49 in the inner and outer covers 34 and 36. The switch 58a includes a pair of generally flat, flexible overlying layers of electrically conductive material, one of which is shown in FIG. 8, that have substantially the same construction as the layers 70 and 72 of FIGS. 1–7. An envelope 120a of electrically insulating material encloses the layers of electrically conductive material. A plurality of openings 140a in the horn switch 58a receive fasteners for connecting the horn switch to the inner cover 34.

The horn switch 58a is connected with a source of electrical energy, such as a vehicle battery, through conductor 160 and a connector 163. The connector 163 may also connect the source of electrical energy with the inflator. The switch 58a is connected with ground through conductor 162. The conductor 162 is enclosed by the envelope of electrically insulating material 120a. An opening 140a extends through the conductor 162 for connecting the horn switch to the inner cover.

An end portion 166 of the conductor 162 is connected to an electrically conductive ring 168. The ring 168 receives a fastener, such as a bolt, for connecting and causing the ring 168 to engage a ground of another circuit or a ground plate.

Alternatively, the end portion 166 of the conductor 162 may have an opening extending therethrough for receiving a fastener to connect the conductor 162 to ground. The end portion 166 has at least one side exposed or not enclosed by the envelope 120a. Preferably, the end portion 166 is made of a highly conductive material, such as copper, and possibly may have a ring made of a highly conductive material attached thereto.

Although each of the layers 70 and 72 has been disclosed as having only one interconnecting portion, it is contemplated that each layer could have two interconnecting portions. The interconnecting portions of one layer would be aligned with the interconnecting portions of the other layer. Therefore, the two layers 70 and 72 would have the same shape.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for enclosing an air bag on a steering wheel of a vehicle having a horn, said apparatus comprising:

an inner cover having a first wall at least partially enclosing the air bag and including means for defining a first tear seam which extends across said first wall and along which said inner cover ruptures upon inflation of the air bag to enable deployment of the air bag;

an outer cover having a second wall at least partially enclosing said inner cover and the air bag and including means for defining a second tear seam which extends across said second wall and along which said outer cover ruptures upon inflation of the air bag to enable deployment of the air bag; and a horn switch disposed between said inner and outer covers for effecting operation of the horn, said horn switch including first and second overlying layers of electrically conductive material and first and second tear seams in said horn switch along which said horn switch ruptures upon inflation of the air bag to enable deployment of the air bag, said first and second tear seams in said horn switch being aligned with said first and second tear seams in said inner and outer covers and having a combined length less than the length of each of said first and second tear seams in said inner and outer covers.

2. An apparatus as set forth in claim 1 wherein said horn switch includes first and second portions located on opposite sides of said first and second tear seams in said horn switch and a pair of spaced apart interconnecting portions interconnecting said first and second portions, said interconnecting portions including said first and second tear seams in said horn switch.

3. An apparatus as set forth in claim 1 wherein said horn switch includes first and second layers of electrically conductive material, each of said first and second layers having portions located on opposite sides of said first and second tear seams in said inner and outer covers and electrically conductive portions interconnecting said portions located on opposite sides of said first and second tear seams in said inner and outer covers.

4. An apparatus as set forth in claim 3 wherein said horn switch includes an envelope of electrically insulating material enclosing said first and second layers of said horn switch.

5. An apparatus as set forth in claim 4 wherein said envelope includes surface means for defining a plurality of openings for receiving fasteners to connect said horn switch to one of said inner and outer covers.

6. An apparatus for enclosing an air bag on a steering wheel of a vehicle having a horn, said apparatus comprising:

an inner cover at least partially enclosing the air bag and including means for defining a first tear seam in said inner cover along which said inner cover ruptures upon inflation of the air bag to enable deployment of the air bag;

an outer cover at least partially enclosing said inner cover and the air bag and including means for defining a second tear seam in said outer cover along which said outer cover ruptures in response to inflation of the air bag to enable deployment of the air bag; and a horn switch disposed between said inner and outer covers for effecting operation of the horn, said horn switch including first and second overlying layers of electrically conductive material, said first layer including a first portion with a first tear line aligned with said first and second tear seams in said inner and outer covers, said second layer including a second portion spaced apart from said first portion with a second tear line aligned with said first and second tear seams in said inner and outer covers and spaced apart from said first tear line along a line extending along said first and second tear lines, said horn switch being rupturable along said first and second tear lines upon inflation of the air bag.

7. An apparatus as set forth in claim 6 wherein said first and second tear lines have a combined length less than a length of said first tear seam in said inner cover.

8. An apparatus as set forth in claim 6 wherein said horn switch includes an envelope of electrically insulating material extending around said first and second layers of said horn switch, said envelope including a first portion extending around said first portion of said first layer and a second portion spaced from said first portion extending around said second portion of said second layer.

9. An apparatus for enclosing an air bag on a steering wheel of a vehicle having a horn, said apparatus comprising:

an inner cover having a first wall at least partially enclosing the air bag, said first wall being movable upon deployment of the air bag;

an outer cover having a second wall at least partially enclosing said inner cover and the air bag and including means for defining a tear seam which extends across said second wall and along which said outer cover ruptures upon inflation of the air bag to enable deployment of the air bag; and a horn switch disposed between said inner and outer covers for effecting operation of the horn, said horn switch including first and second overlying layers of electrically conductive material and an envelope of electrically insulating material enclosing said first and second layers, said horn switch including a tear seam along which said horn switch ruptures upon inflation of the air bag to enable deployment of the air bag.

10. An apparatus as set forth in claim 9 wherein said tear seam in said horn switch is aligned with said tear seam in said outer cover.

*11. An apparatus for enclosing an air bag on a steering wheel of a vehicle having a horn, said apparatus comprising:*

*a cover wall having a tear seam along which said cover wall ruptures in response to inflation of the air bag to enable deployment of the air bag; and*

*a horn switch including first and second overlying layers of electrically conductive material, said first layer including a first portion with a first tear line aligned with said tear seam in said cover wall, said second layer including a second portion which is spaced apart from said first portion and which has a second tear line aligned with said tear seam in said cover wall, said second tear line being spaced apart from said first tear line along a line extending along said first and second tear lines, said horn switch being rupturable along said first and second tear lines upon inflation of the air bag.*

*12. An apparatus for enclosing an air bag on a steering wheel of a vehicle having a horn, said apparatus comprising:*

*a cover wall having a tear seam along which said cover wall ruptures in response to inflation of the air bag to enable deployment of the air bag; and*

*a horn switch including first and second overlying layers of electrically conductive material, said first layer including a first portion with a first tear line aligned with said tear seam in said cover wall, said second layer including a second portion which is spaced apart from said first portion and which has a second tear line aligned with said tear seam in said cover wall, said second tear line being spaced apart from said first tear line along a line extending along said first and second tear lines, said horn switch being rupturable along said first and second tear lines upon inflation of the air bag,*

*said first and second tear lines having a combined length less than the length of said tear seam in said cover wall.*

*13. An apparatus for enclosing an air bag on a steering wheel of a vehicle having a horn, said apparatus comprising:*

*a cover wall having a tear seam along which said cover wall ruptures in response to inflation of the air bag to enable deployment of the air bag; and*

*a horn switch including first and second overlying layers of electrically conductive material, said first layer including a first portion with a first tear line aligned with said tear seam in said cover wall, said second layer including a second portion which is spaced apart from said first portion and which has a second tear line aligned with said tear seam in said cover wall, said second tear line being spaced apart from said first tear line along a line extending along said first and second tear lines, said horn switch being rupturable along said first and second tear lines upon inflation of the air bag,*

*said horn switch including an envelope of electrically insulating material extending around said first and second layers of electrically conducive material, said envelope including a first portion extending around said first portion of said first layer and including a second portion which is spaced from said first portion and which extends around said second portion of said second layer.*

* * * * *